June 13, 1967 TORU MATSUMOTO 3,324,776
REFLEX CAMERA WITH INCORPORATED PHOTOELECTRIC ELEMENT
Filed Dec. 24, 1963 4 Sheets-Sheet 1
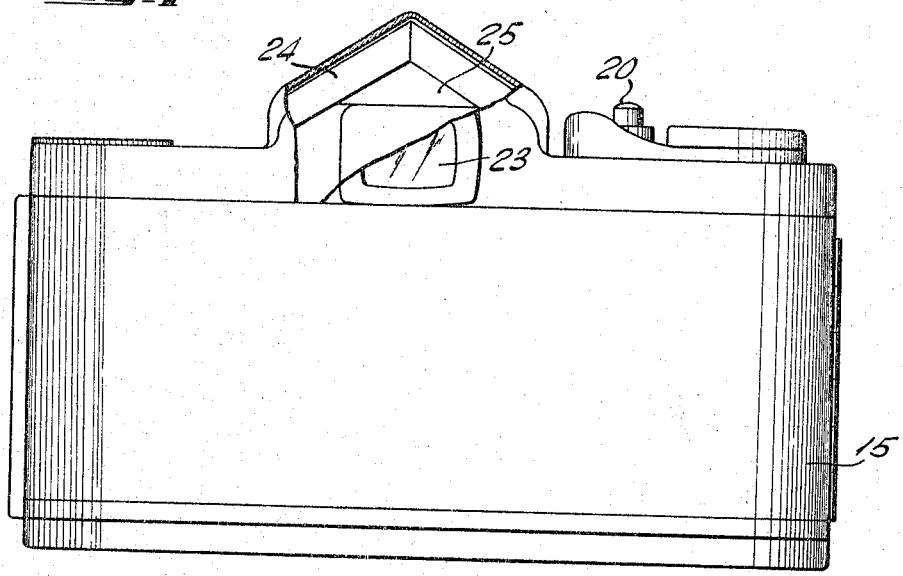
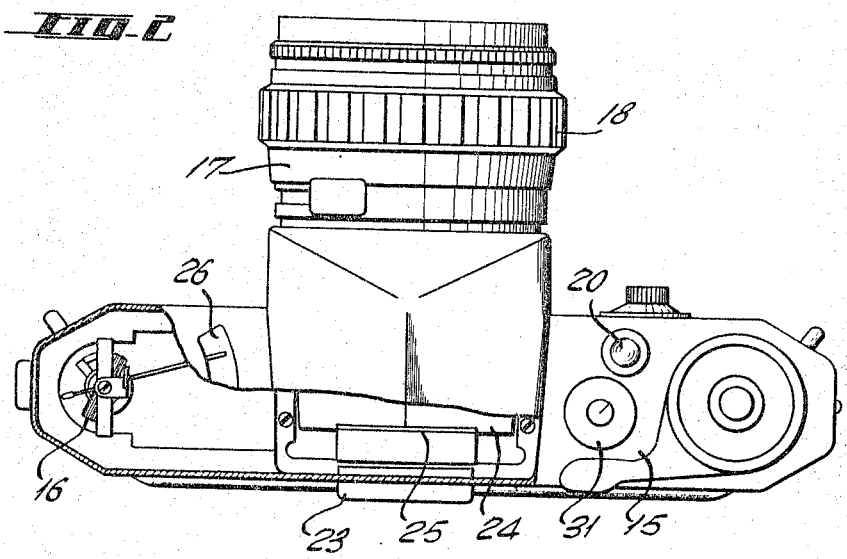
INVENTOR.
TORU MATSUMOTO
BY Stanley Wolder INVENTOR.
TORU MATSUMOTO
BY Stanley Wolder

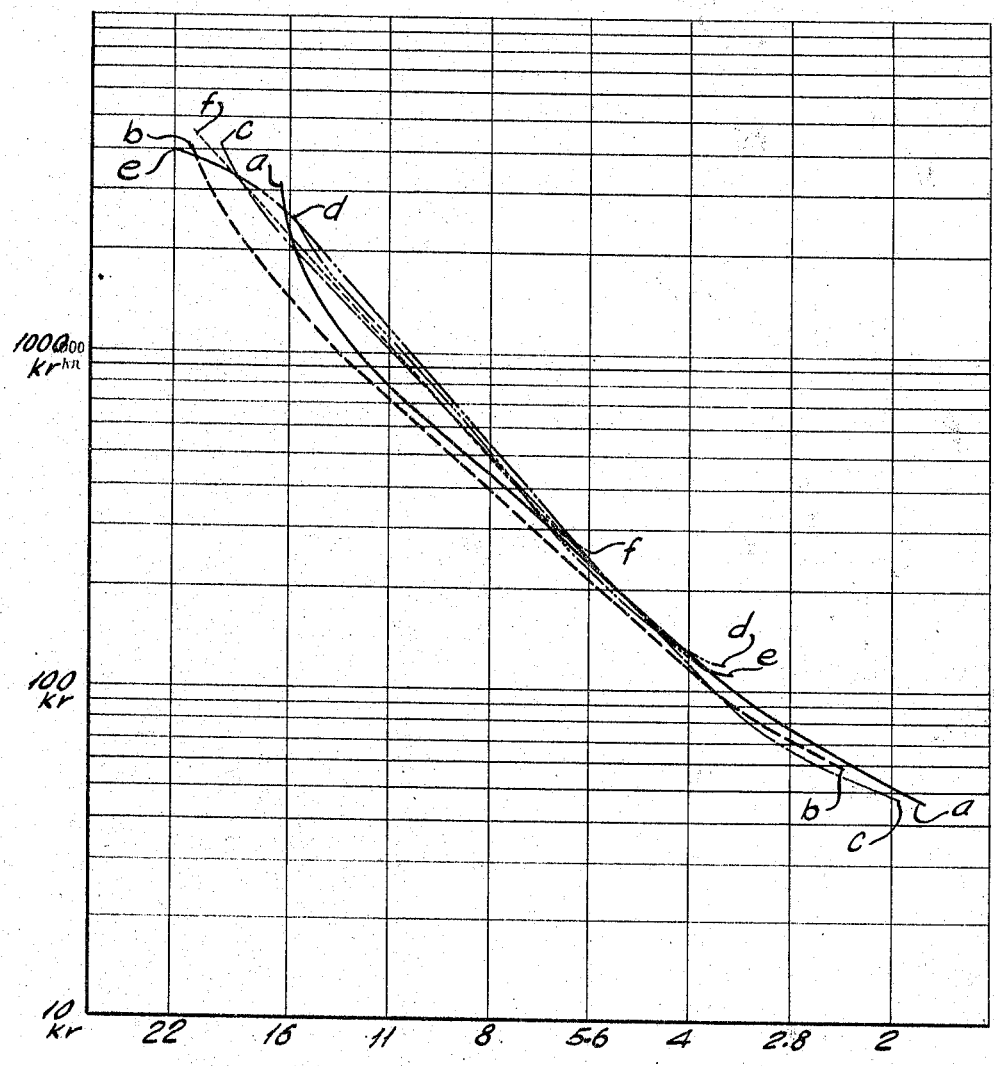

United States Patent Office

3,324,776
Patented June 13, 1967

3,324,776
REFLEX CAMERA WITH INCORPORATED
PHOTOELECTRIC ELEMENT
Toru Matsumoto, Itabashi-ku, Tokyo, Japan, assignor to Asahi Kogaku Kogyo Kabushiki Kaisha, Tokyo, Japan, a corporation of Japan
Filed Dec. 24, 1963, Ser. No. 333,133
2 Claims. (Cl. 95—10)

The present invention relates generally to improvements in photographic cameras and it relates more particularly to an improved single lens reflex camera having a prism viewing system and provided with a photosensitive element for controlling the camera exposure or for indicating the light intensity of the image produced by the camera lens.

It has heretofore been proposed to position a photocell in a reflex camera on a section of the principal mirror or on the section of an auxiliary mirror which serves to direct the light reflected by the principal mirror to the eyepiece, as described, for example, in the United States Patent No. 3,060,823. The aforesaid system is deficient in that since part of the image producing reflected light is absorbed by the light receiving element such as the photocell arranged on the mirror surface the image as actually observed in the corresponding image angle diminishes its brightness, rendering, especially in cases of photographing subjects under comparatively low illumination, the photographing operation difficult owing to unnecessarily dim and obscure field of the viewfinder. Also, as a consequence of the dimly viewed image, the focusing operation before the shutter operation often becomes difficult. Accordingly, in practice, it is generally unsatisfactory to employ the above type of system which utilizes a part of the light rays coming from the camera lens and reflected by the mirror.

In an attempt to avoid the adverse influence upon the image on the focal plane or upon the brightness thereof it has also been proposed that the light sensitive element be arranged at the peripheral part of the mirror or outside the image-forming plane. According to this system, however, measurement is made of the light rays not within but outside the necessary image angle so that the result of the measurement is not a true indication of the image light intensities and is not reliable. Arrangement of the photocell on the focusing glass or its vicinity has also been proposed in German Patent No. 722,135, however, in this system the above explained drawback relating to the projected image and the brightness thereof is not eliminated.

It is thus a principal object of the present invention to provide an improved camera.

Another object of the present invention is to provide an improved camera including a photosensitive element for controlling the camera exposure mechanism or for furnishing a measurement of the incident light.

Still another object of the present invention is to provide an improved single lens reflex camera including an exposure control or light measuring photosensitive element which accurately responds to the overall light intensity of the framed image produced by the camera objective lens without interfering in any way with the viewing of the image.

A further object of the present invention is to remedy the defects of the earlier light measuring systems so as to furnish an accurate exposure measurement according to the image produced by the mirror reflected light rays and also to make accurate setting operation of the exposure mechanism according to the result of said measurement.

Still a further object of the present invention is to locate the light receiving element such as photocell at such a part of the camera structure as not to obstruct the movement of other operating members of the camera and further to greatly simplify the operation of incorporating the light receiving element in the camera structure.

The above and other objects of the present invention will become apparent from a reading of the following description taken in conjunction with the accompanying drawings, wherein:

FIGURE 1 is a rear view of a camera embodying the present invention, illustrated partly broken away;

FIGURE 2 is a top plan view thereof illustrated partly broken away;

Each of FIGURES 4 to 13 is a rear elevational view of a pentaprism and illustrates an example in accordance with the present invention of arranging the light receiving element such as photoconductor over such portion of the rear face of the pentagonal roof prism as not to register with the viewfinder portion adjacent to the eye of the viewer; and FIGURE 14 is a graph showing light resistance characteristic curves of a photoconductor located in accordance with the present invention at such portion of the pentagonal roof prism light ray issuing surface as not to register with the viewfinder part adjacent to the eye of the viewer, each curve representing the use of a camera lens of different focal length.

Figure 3:
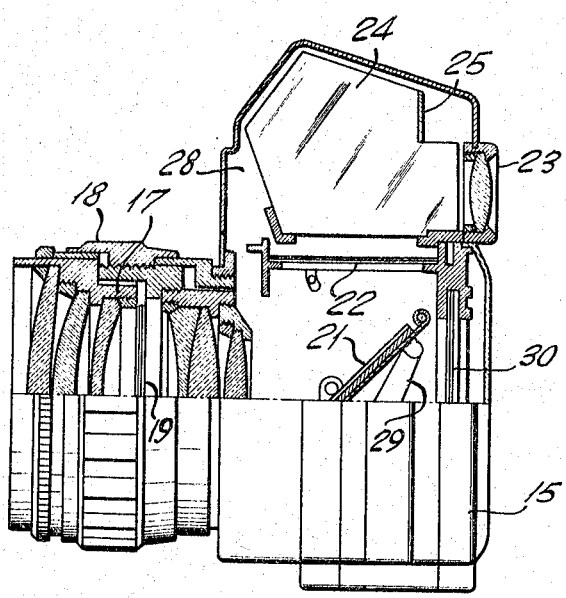
FIGURE 3 is a side elevational view thereof with its upper portion in section.
Figure 4:
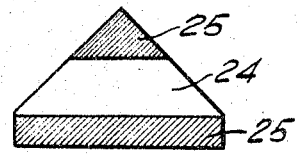
Figure 5:
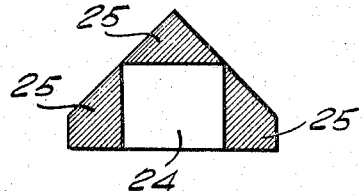
Figure 6:
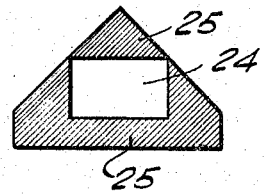
Figure 7:
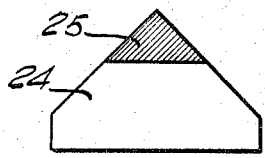
Figure 8:
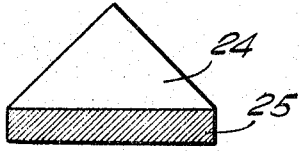
Figure 9:
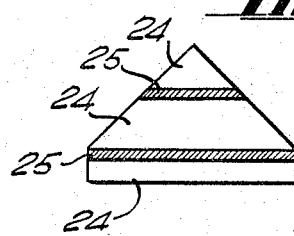
Figure 10:
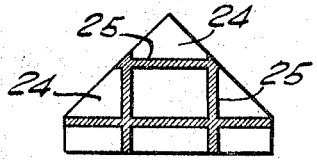
Figure 11:
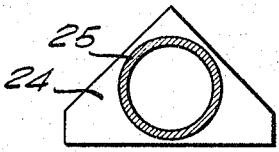
Figure 12:
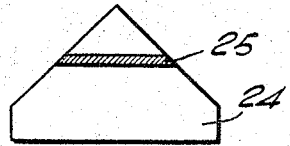
Figure 13:
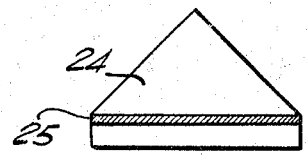

Referring now to FIGURES 1 to 3 of the drawing which illustrates a preferred embodiment of the present invention, an objective lens 17 is releasably secured to the front part of a camera body 15. The objective lens 17 may be one fixed to the body 15 as in the case of a single lens reflex camera having a lens shutter, or may be a changeable lens permitting the use of lenses of various image angles, such as wide angle lens or telephoto lens. Turning of the diaphragm ring 18 around the objective 17 will set the iris diaphragm 19 to the desired aperture. In the case of an automatic diaphragm setting camera in which the shutter release operation due to depression of the shutter button 20 will automatically set the iris diaphragm to the desired value, it is desirable that during the exposure measurement the operator can manually operate the diaphragm setting member 18 to set the desired opening. The present invention can also be applied to a camera with an automatic exposure control device in which the film sensitivity and/or shutter speed are introduced into the elements determining the output of the exposure measuring circuit, and the output current corresponding to the output or resistance of the light receiving element in response to the brightness of the object to be photographed causes the movement of the microammeter pointer and accordingly the coupled operation of the diaphragm blades and for the exposure time. The member indicated as iris diaphragm 19 corresponds to said diaphragm blades coupled to the microammeter.

For ready understanding of the feature of the present invention, the microammeter 16 is shown with such arrangement as to indicate the proper shutter speed according to the object brightness as seen through the objective 17 which is set to a predetermined diaphragm aperture. The numeral 26 indicates a window showing the shutter speed value as indicated by the microammeter 16.

Behind the objective 17 there is located a mirror 21 as is usual with the conventional single lens reflex camera which mirror 21 is swung up at the moment of the exposure in the usual fashion by means of mirror operating lever 29. The energy for this swinging up and returning movement of the mirror operating lever 29 is stored by the cocking of the film winding lever 27 for shutter charge and film winding. As is well known, on depression of the shutter button 20 for shutter release, prior to operation of the focal plane shutter 30, the mirror operating lever 29 operates in the direction of swinging the mirror up, and, while the mirror 21 remains at the swung up position the focal plane shutter 30 operates.

The reference numeral 24 is a pentagonal roof prism commonly known as a pentaprism, for making a right image by lateral inversion due to reflection of the light rays passing through the objective 17 and reflected by the mirror 21. This prism is commonly used to observe the image of the object to be photographed directly by means of an eyepiece 23. The reference numeral 22 indicates the framed image forming plane of the objective 17, the image being observed by the photographer through the eyepiece 23. The light rays issuing from the image formed at the plane 22 are so reflected by the top faces of the prism 24 as to cause lateral inversion, and then due to the front reflecting surface 28 the rays are directed to and through the rear side or face where the eyepiece 23 is arranged.

The camera according to the present invention is characterized in that measurement is made of the rays which are reflected by the face 28 but are not directed to the eyepiece 23. For this purpose a light receiving photosensitive element 25 is so arranged as to receive the light rays directed to the outside of the eyepiece 23. The element 25 may be a current source such as photocell or a photoconductor connected through a power source such as battery (not shown) to a current actuated or motivated device such as the microammeter 16.

Various positions or shapes of the light receiving element 25 are shown in FIGRES 4 to 13. These many modifications may be advantageously made with photoconductor as the light receiving photosensitive element.

In the camera according to the present invention, the whole light rays within the image angle passing through the objective 17 are reflected by the mirror 21 and are focused on and form an image at the focal plane 22, which image is of the same size as that of the picture to be taken. In the backward projection of the image by means of the reflecting-inverting optical system or a pentagonal roof prism 24, only the light rays projected onto the focal plane 22 are reflected by said reflecting-inverting optical system or the prism 24 and fall on the light receiving photosensitive element 25 consisting of a photocurrent source as a selenium photocell or a cadmium sulphide photoconductor which varies in electrical resistance in accordance with the light incident therein. Accordingly, light rays other than that falling on the focal plane 22 does not fall on the photosensitive element 25 so that the photosensitive element 25 responds to the average light intensity of the whole light rays within the photographed area. As a result, with the image angle of the objective 17 being changed because of a variation of the focal length thereof due to a change of the camera objective, the light measurement is always made of the brightness within the image angle. The light receiving element 25 is so located outside of the eyepiece 23 and at the light ray issuing face of the reflecting-inverting optical system or the pentagonal roof prism 24 due to the reflecting surface 28 is to receive the rays issuing from said optical system 24. Accordingly, there is no trouble in observing the focal plane 22 through the eyepiece 23 for focusing or determination of the area to be photographed, and any darkening or blurring of the projected or viewed image is obviated and the aforementioned defects of the other systems avoided.

In the known art where the photocell is arranged at a portion or peripheral part of the reflex mirror or at a portion of the focal plane, light rays entering in the direction reverse to the issuing light rays are apt to fall on the photocell and adversely effect the accuracy of the photocell response. In the camera according to the present invention, however, the outer light rays entering through the eyepiece 23 are reflected by the face 28 of the reflecting-inverting optical system or the pentagonal roof prism 24 and are directed to the reflecting face of the top portion of the prism and no significant portion of such rays directly falls on the light receiving element 25 arranged at the light ray issuing face of the prism 24. Accordingly, this adverse influence being avoided, highly accurate measurement can be effected.

The position of the light receiving element 25 is not limited to that shown in FIGURE 3 but may be arranged, for example, as shown in FIGURES 4–13 and may be positioned at both sides of or under the eyepiece 23. The example as shown in FIGURE 3 where the element 25 is positioned at a cutout portion of the pentagonal roof prism 24 for preventing internal additional reflection within the prism 24, is preferable because additional space for arrangement of the element is unnecessary so that the shape of the camera is not changed and the ordinary outer configuration of the camera can be maintained.

As aforementioned, in the camera according to the present invention, objectives 17 of various focal distances can be utilized without adversely effecting the light measurements. The characteristic of the light receiving element 25 with respect to such varying focal length of the objective is shown in FIGURE 14. In the data shown in FIGURE 14, the variation of the resistance of a photoconductor 25 with respect to an object to be photographed of a constant brightness, is indicated. The abscissa axis is calibrated with iris diaphragm aperture values 2, 2.8, 4, 5.6, 8, 11, 16, 22, successively diminishing by one-half of the preceding one as well known in camera art, of the objective 17 of varying focal distance. The ordinate axis represents the resistance variation of the photoconductor 25 in logarithmic scale. Each of the curves in the graph corresponds to the case of a specific objective, as follows.

*a—a*: wide angle lens of focal length 35 mm.
*b—b*: standard image angle lens of focal length 55 mm.
*c—c*: medium telephoto lens of focal length 85 mm.
*d—d*: telephoto lens of focal length 135 mm.
*e—e*: high telephoto lens of focal length 200 mm.
*f—f*: ultrahigh telephoto lens of focal length 300 mm.

This result of the experiment indicates that the variation of the image angle, and accordingly, of the focal length of the objective 17, has no significant influence over the measured light value, causing in practice no trouble at all.

With the light receiving element 25 connected to a microammeter 16, the appropriate shutter speed value in accordance with the aperture of the iris diaphragm 19 and the brightness within the image angle, is shown in the window 26. Setting of the shutter speed dial 31 according to said value will enable the operator to carry out the photographing operation with necessary proper exposure.

What is shown in FIGURES 1–3 is one example only of the embodiment of the present invention. As mentioned before, the present invention can be applied to cameras with meter coupled diaphragm arrangement, and further modifications can be made as necessity demands.

What is claimed is:
1. A reflex camera comprising an objective lens for focusing image forming rays, a mirror disposed behind said objective lens and along the axis thereof, a unitary pentaprism having a first face directed to receive said image forming rays reflected by said mirror and a second rearwardly directed face including forwardly and rearwardly offset portions, and a plurality of reflecting faces cooperating to internally reflect said image forming rays incident on said first face rearwardly through said second face, an eyepiece confronting said second face rearwardly offset portion and in the path of said image forming rays, a photosensitive element positioned on said pentaprism out of registry with said eyepiece and out of exposure to said image forming rays directed from said objective lens toward said eyepiece, and confronting and registering with said second face forwardly offset portion and disposed in the path of light incident on said first surface and reflected by said prism reflecting faces, and a current responsive device connected to said photosensitive element.

2. The reflex camera of claim 1 wherein said photosensitive element is a photoconductor.

References Cited

UNITED STATES PATENTS

| | | | |
|---|---|---|---|
| 2,608,921 | 9/1952 | Studdert | 95—42 |
| 3,060,823 | 10/1962 | Nelson | 95—1( |
| 3,192,841 | 7/1965 | Reymond | 95—6⸱ |
| 3,194,136 | 7/1965 | Ort | 95—1( |

FOREIGN PATENTS

| | | |
|---|---|---|
| 1,315,377 | 12/1962 | France. |
| 722,135 | 7/1942 | Germany. |
| 888,802 | 9/1953 | Germany. |
| 969,693 | 7/1958 | Germany. |

NORTON ANSHER, *Primary Examiner.*

J. F. PETERS, JR., *Assistant Examiner.*